United States Patent
Poster

(10) Patent No.: US 10,221,939 B2
(45) Date of Patent: Mar. 5, 2019

(54) SYSTEM AND APPARATUS FOR SUPPORTING A PLANETARY CARRIER WITHIN A GEARBOX

(71) Applicant: Bell Helicopter Textron Inc., Fort Worth, TX (US)

(72) Inventor: Scott Poster, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 65 days.

(21) Appl. No.: 15/434,609

(22) Filed: Feb. 16, 2017

(65) Prior Publication Data

US 2017/0234421 A1    Aug. 17, 2017

Related U.S. Application Data

(60) Provisional application No. 62/295,922, filed on Feb. 16, 2016.

(51) Int. Cl.
*F16H 57/08* (2006.01)
*B64D 35/00* (2006.01)

(52) U.S. Cl.
CPC ........... *F16H 57/082* (2013.01); *B64D 35/00* (2013.01); *F16H 57/08* (2013.01)

(58) Field of Classification Search
None
See application file for complete search history.

(56) References Cited

U.S. PATENT DOCUMENTS

| | | | | |
|---|---|---|---|---|
| 2,520,887 A | * | 8/1950 | Miller, Jr. | B64C 27/12 416/170 R |
| 2,911,851 A | * | 11/1959 | Wachs | B64C 27/12 244/60 |
| 3,255,825 A | * | 6/1966 | Mouille | B64C 27/12 244/60 |
| 3,486,832 A | * | 12/1969 | Carnell | B64C 27/14 416/114 |
| 4,856,377 A | * | 8/1989 | Goudreau | F02C 7/36 475/331 |
| 4,983,153 A | * | 1/1991 | Luijten | B64C 27/12 416/170 R |
| 5,135,442 A | * | 8/1992 | Bossler, Jr. | B64C 27/12 475/1 |
| 5,149,311 A | * | 9/1992 | Luijten | B64C 27/12 244/60 |
| 5,421,656 A | * | 6/1995 | Chory | B64C 27/12 384/551 |
| 5,472,386 A | * | 12/1995 | Kish | B64C 27/14 244/60 |
| 5,797,185 A | * | 8/1998 | Sammataro | B64C 27/12 244/60 |
| 5,802,918 A | * | 9/1998 | Chen | B64C 27/12 74/409 |
| 5,807,202 A | * | 9/1998 | Sammataro | B64C 27/14 244/60 |
| 6,302,356 B1 | * | 10/2001 | Hawkins | B64C 27/12 244/17.11 |

(Continued)

FOREIGN PATENT DOCUMENTS

DE    102016202753 A1 * 8/2017    ............... F16D 1/06

*Primary Examiner* — Dirk Wright

(57) ABSTRACT

An apparatus and system for supporting a planetary carrier within an aircraft gearbox includes a retainer for engaging a rotor mast and for supporting the planetary carrier.

29 Claims, 7 Drawing Sheets

(56) References Cited

U.S. PATENT DOCUMENTS

| | | | | |
|---|---|---|---|---|
| 6,443,035 B1* | 9/2002 | Scardullo | ............... | B64C 27/12 |
| | | | | 74/417 |
| 6,902,508 B2* | 6/2005 | Stille | ............... | B64C 27/12 |
| | | | | 464/182 |
| 8,585,536 B2* | 11/2013 | Norem | ............... | F16H 57/082 |
| | | | | 475/331 |

* cited by examiner

SYSTEM AND APPARATUS FOR SUPPORTING A PLANETARY CARRIER WITHIN A GEARBOX

CROSS-REFERENCE TO RELATED APPLICATIONS

This application claims the benefit of provisional U.S. Patent Application Ser. No. 62/295,922, which was filed in the U.S. Patent and Trademark Office on Feb. 16, 2016. Application Ser. No. 62/295,922 is incorporated herein by reference in its entirety.

FIELD OF THE INVENTION

The application generally relates to rotorcraft drive systems and, more particularly, to a system and method of supporting a planetary carrier within rotorcraft gearbox.

BACKGROUND OF THE INVENTION

Rotorcraft drive systems typically include one or more gearboxes. A rotorcraft gearbox—particularly a main rotor gearbox—will often include one or more planetary gear sets. The planetary gear set may include a central sun gear, an outer ring gear, and a plurality of planet gears rotatably coupled to a planetary carrier and configured to "orbit" the sun gear while engaging both the sun gear and the ring gear. Typically, the sun gear receives the torque input to the planetary gear set while the planetary carrier provides the torque output from the planetary gear set. The planetary carrier is often coupled to a rotor mast, such that the torque output from the planetary gear set is applied to the rotor mast.

In some rotorcraft, the planetary carrier and the rotor mast are coupled together using a set of splines. For example, internal splines located on the planetary carrier may transmit the torque output from the planetary gear set to mating external splines located on the rotor mast. Because these splines are typically helical or aligned axially (i.e., substantially parallel to the longitudinal axis of the rotor mast), they provide no support for the planetary carrier in the axial direction.

One solution is to provide carrier-support bearings that support the planetary carrier relative to some fixed structure within the gearbox. The carrier-support bearings are typically rolling-element bearings, such as a ball bearing. However, this solution has several drawbacks. The addition of the carrier-support bearings introduces one or more additional components, which may add complexity to the design, increase weight, and make assembly more difficult. Additionally, the carrier-support bearing will typically necessitate that the planetary carrier include a mating bearing surface, which adds to the cost and complexity of manufacturing the planetary carrier. For instance, the bearing surface will typically require one or more additional machining steps, which might need to be held to tight tolerances. Furthermore, the carrier-support bearing will typically require lubrication, which may require one or more dedicated lube jets to provide oil to the carrier-support bearing. Lubricating the carrier-support bearing may further necessitate additional core passages in the gearbox housing. The addition of lube jets and/or core passages may further negatively impact the gearbox's weight, cost, design complexity, and manufacture and assembly. The carrier-support bearing may require periodic inspection, maintenance, and/or replacement. And, the carrier-support bearing introduces an additional potential failure mode within the gearbox. Other drawbacks associated with such a design will be apparent to one skilled in the art.

Other rotorcraft utilize a rotor mast with an integral planetary carrier. That is, the rotor mast and the planetary carrier are a single, unitary piece having a rotor mast portion and a planetary carrier portion. The planetary carrier is, therefore, supported in the axial direction by the rotor mast portion, which is, in turn, supported in the axial direction by mast bearings. This solution also has several drawbacks. For instance, the gearbox assembly may be more difficult to assemble, ship, and/or store, and it may require more space, because the rotor mast is permanently affixed to the planetary carrier. Manufacture of the rotor mast with integral planetary carrier may be significantly more expensive than the manufacture of two separate parts, particularly because a rotor mast alone might be manufactured from an appropriately sized pipe structure, while a rotor mast with integral planetary carrier might have to be machined from a large billet, casting, or forging, which will potentially result in more machining steps, a longer cycle time, and more material waste. Another disadvantage is that shipping, overhaul, and repair of the mast and/or gearbox becomes more difficult and expensive where the rotor mast and planetary carrier are a single, unitary piece. And, damage or wear to either the rotor mast or the planetary carrier will necessitate overhaul or replacement of the entire unitary piece—which is itself more expensive to repair, overhaul, or manufacture than a separate rotor mast and/or planetary carrier would be.

Consequently, a need exists for a method and apparatus for supporting a planetary carrier in the axial direction, without permanently coupling the planetary carrier to the rotor mast, and without introducing an additional bearing dedicated solely to providing axial support for the planetary carrier. These and other advantages of the present invention will become apparent to one skilled in the art. The embodiments described below, and the inventions set forth in the appended claims, may provide all, some, or none of these advantages.

SUMMARY OF THE INVENTION

In one aspect, the invention includes an aircraft gearbox comprising: a gearbox housing; a planetary gear set disposed within the gearbox housing, the planetary gear set comprising: a sun gear; a ring gear; a planetary carrier; and a plurality of planet gears; and a retainer configured to be coupled to a mast, the retainer comprising a surface configured to support the planetary carrier.

In another aspect, the invention includes a retainer for supporting a planetary carrier within a gearbox comprising: a coupling feature adapted for coupling the retainer to a mast; and a surface configured to support the planetary carrier.

In a third aspect, the invention includes an aircraft gearbox comprising: a gearbox housing; a planetary gear set disposed within the gearbox housing, the planetary gear set comprising: a sun gear configured to receive rotational energy from an input; a stationary ring gear fixedly mounted within the gearbox housing; a planetary carrier configured to transmit rotational energy to a mast through a first set of splines provided on the planetary carrier and a second set of splines provided on the mast, the planetary carrier being an overhung planetary carrier comprising a plurality of downwardly-extending, cantilevered posts; and a plurality of planet gears, each of the plurality of planet gears being rotatably mounted on one of the posts of the planetary carrier, wherein the sun gear, the planetary carrier, and the mast are all configured to rotate about a substantially common axis of rotation, the axis of rotation defining an axial direction; and a retainer configured to be coupled to the mast, the retainer comprising a surface configured to support the planetary carrier in the axial direction.

BRIEF DESCRIPTION OF THE DRAWINGS

Preferred features of certain embodiments of the present invention are disclosed in the accompanying drawings, wherein similar reference characters denote similar elements throughout the several views, and wherein.

DETAILED DESCRIPTION

The embodiments of the present invention will now be described more fully, with reference to the accompanying drawings, in which preferred embodiments of the invention are shown. This invention may, however, be embodied in many different forms and should not be construed as limited to the illustrated embodiments set forth herein. Rather, the illustrated embodiments are provided so that this disclosure will be thorough and complete and will convey the scope of the invention to those skilled in the art.

In the interest of clarity and brevity, all features of an embodiment may not be described. In the development of any actual embodiment, numerous implementation-specific decisions must be made to achieve the developer's specific goals, such as compliance with system-related and business-related constraints, which will vary from one implementation to another. While such a development effort might be complex and time-consuming, it would, nevertheless, be a routine undertaking for those of ordinary skill in the art having the benefit of this disclosure.

Figure 1:
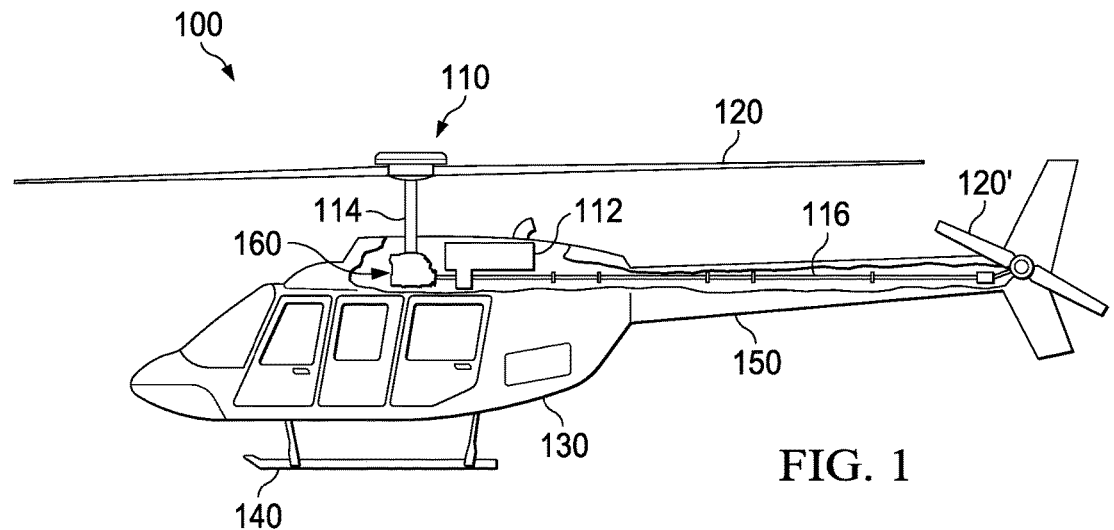
FIG. 1 shows a rotorcraft according to one embodiment.
Figure 2:
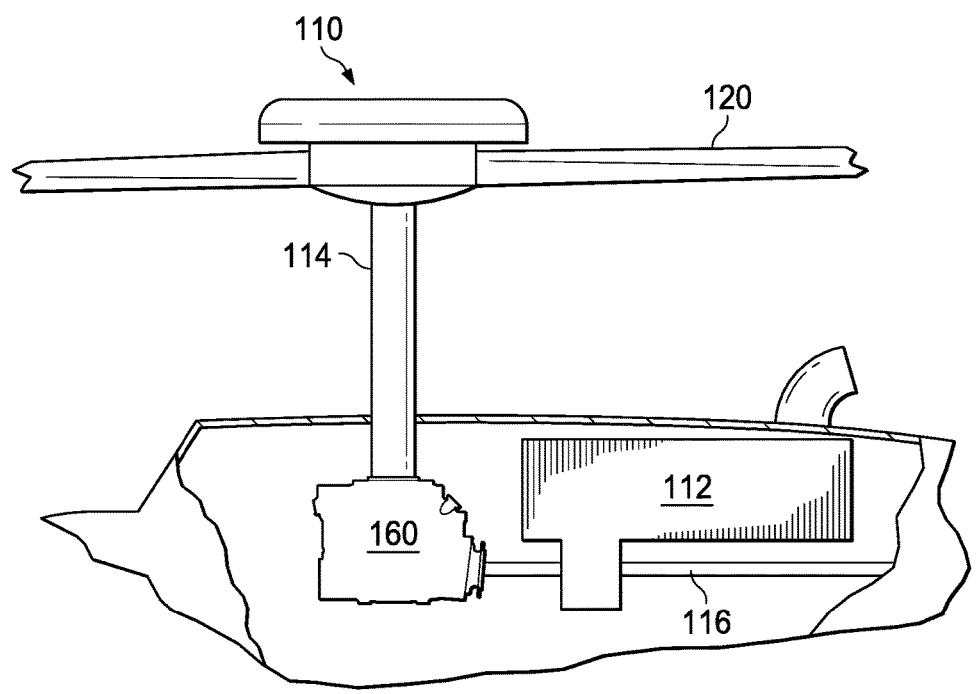
FIG. 2 shows the power train system of the rotorcraft of FIG. 1.

FIG. 1 shows a rotorcraft 100 according to one example embodiment. Rotorcraft 100 features power train system 110, main rotor blades 120, tail rotor blades 120', a fuselage 130, a landing gear 140, and an empennage 150. Power train system 110 may rotate blades 120 and/or blades 120'. FIG. 2 shows the power train system 110 of FIG. 1.

In the example of FIGS. 1 and 2, power train system 110 includes an engine 112, a gearbox 160, a rotor mast 114, and a tail rotor drive shaft 116. Engine 112 supplies torque to mast 114, via gearbox 160, for rotating of blades 120. Engine 112 also supplies torque to tail rotor drive shaft 116 for rotating blades 120'. In the examples of FIGS. 1 and 2, gearbox 160 is a main rotor transmission system. Teachings of certain embodiments recognize, however, that power train system 110 may include more or different gearboxes than gearbox 160 shown in FIG. 1. Power train system 110 may include a control system for selectively controlling the pitch of each blade 120 in order to selectively control direction, thrust, and lift of rotorcraft 100.

Fuselage 130 represents the body of rotorcraft 100 and may be coupled to power train system 110 such that power train system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features blades 120'. Power train system 110 and blades 120' may collectively provide thrust in the same direction as the rotation of blades 120 so as to counter the torque effect created by blades 120. It should be appreciated that teachings from rotorcraft 100 may apply to aircraft other than rotorcraft, such as airplanes, tilt rotors, and unmanned aircraft, to name a few examples. In addition, teachings of certain embodiments relating to rotor systems described herein may apply to power train system 110 and/or other power train systems, including but not limited to non-rotorcraft power train systems.

In the embodiment of FIGS. 1 and 2, gearbox 160 transmits power from a power source (e.g., engine 112) to an object or objects to be moved (e.g., blades 120). Gearbox 160 converts speed and torque between the power source and the object(s) to be moved. Gearbox 160 may be configured to reduce the speed of the rotational output of engine 112, while increasing the torque applied to blades 120.

Figure 3A:
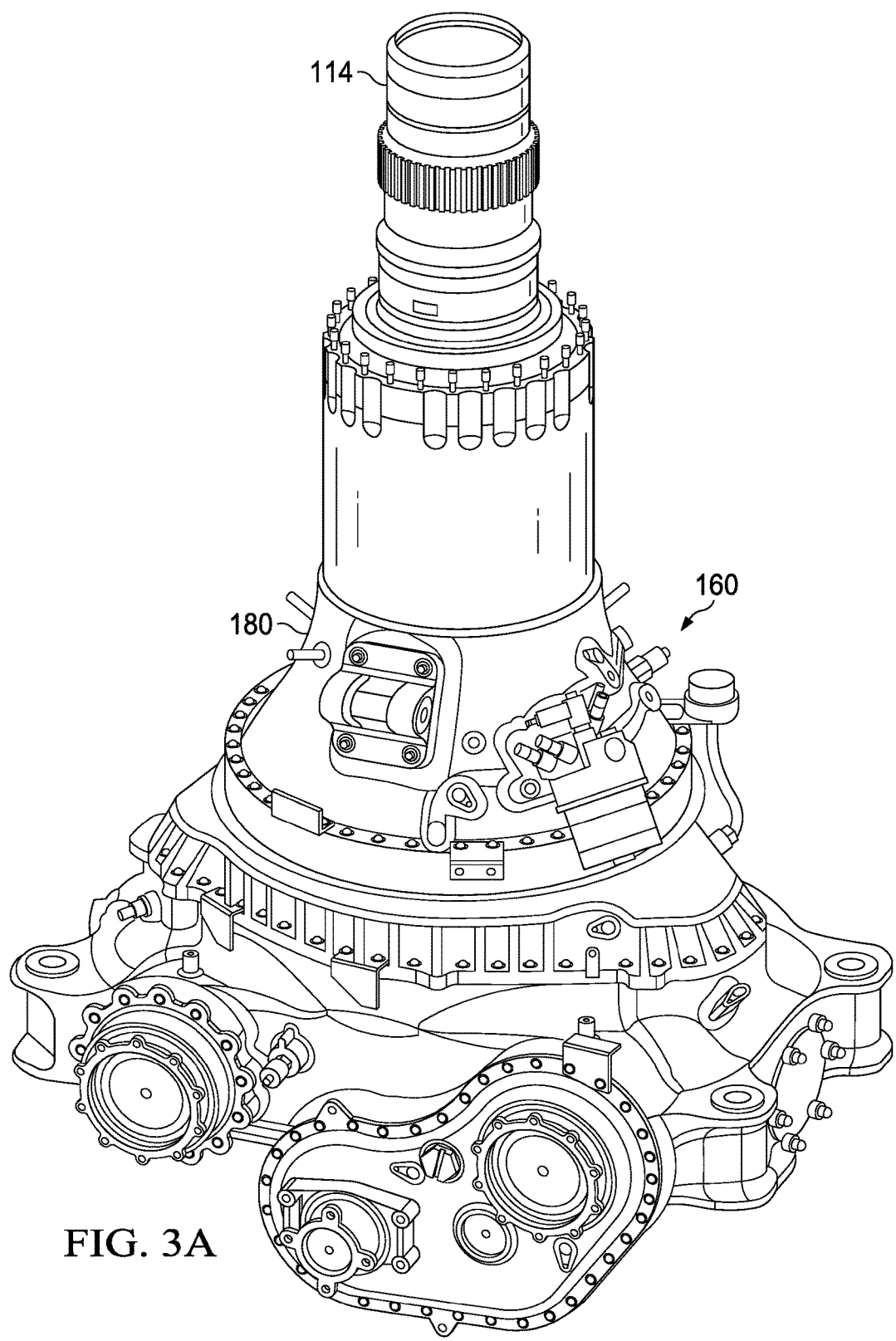
FIG. 3A shows an isometric view of a rotorcraft gearbox according to one embodiment.
Figure 3B:
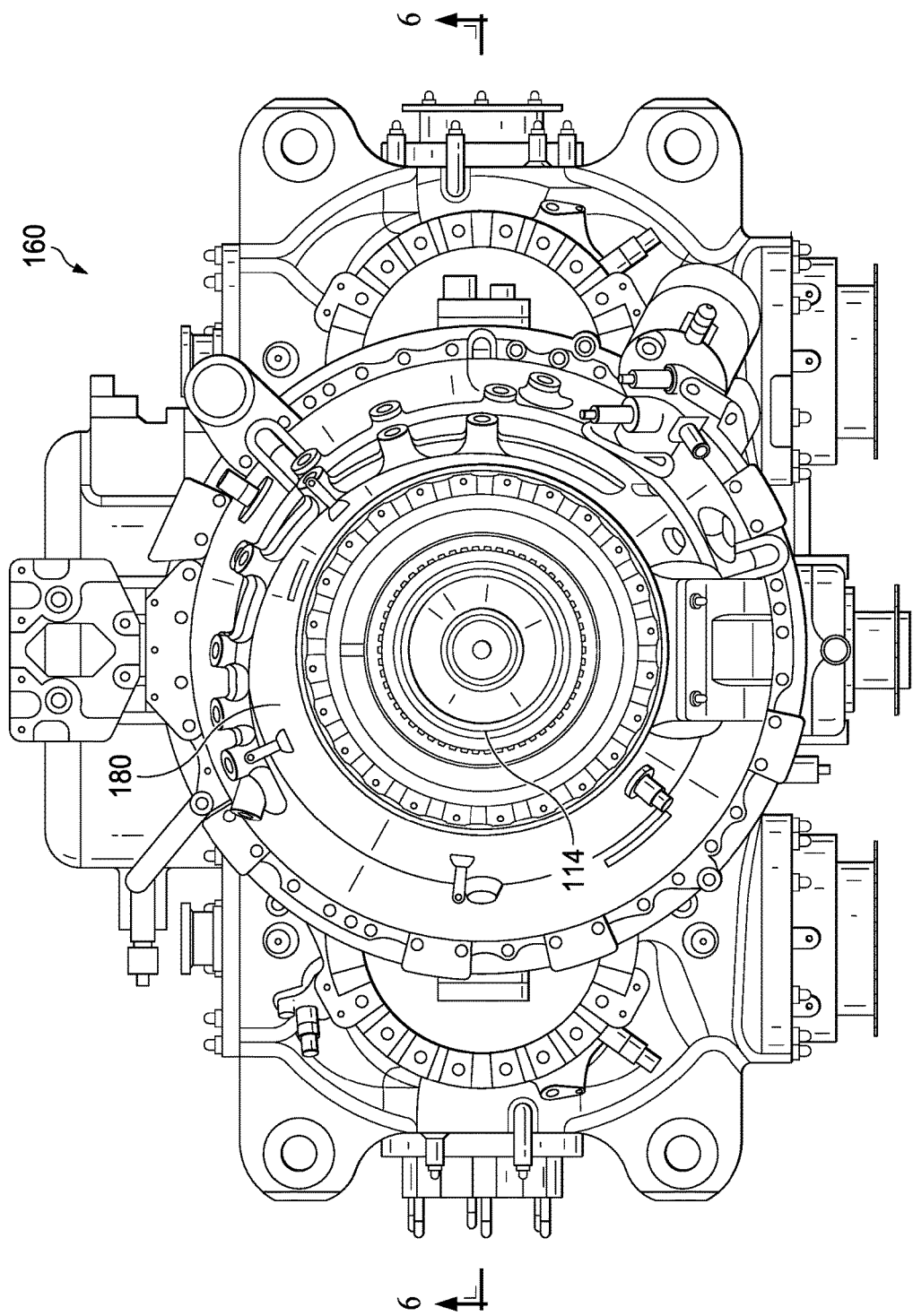
FIG. 3B shows a top view of the rotorcraft gearbox of FIG. 3A.

FIGS. 3A and 3B show a gearbox 160 according to one example embodiment. According to the embodiment of FIGS. 3A and 3B, gearbox 160 is a main rotor gearbox and includes a rotor mast 114. Gearbox 160 also includes at least one gearbox housing 180 and various gears contained therein (see FIGS. 4 and 5). A gear is a rotating part having teeth that mesh with another toothed part in order to transmit rotational energy. As one skilled in the art will readily appreciate, the gears within gearbox 160 accomplish speed and torque conversions that are desired for a given implementation. For instance, the gearbox 160 of FIGS. 3A and 3B reduces rotational speed while multiplying the torque output, which is applied to blades 120 of rotorcraft 100.

Figure 4:
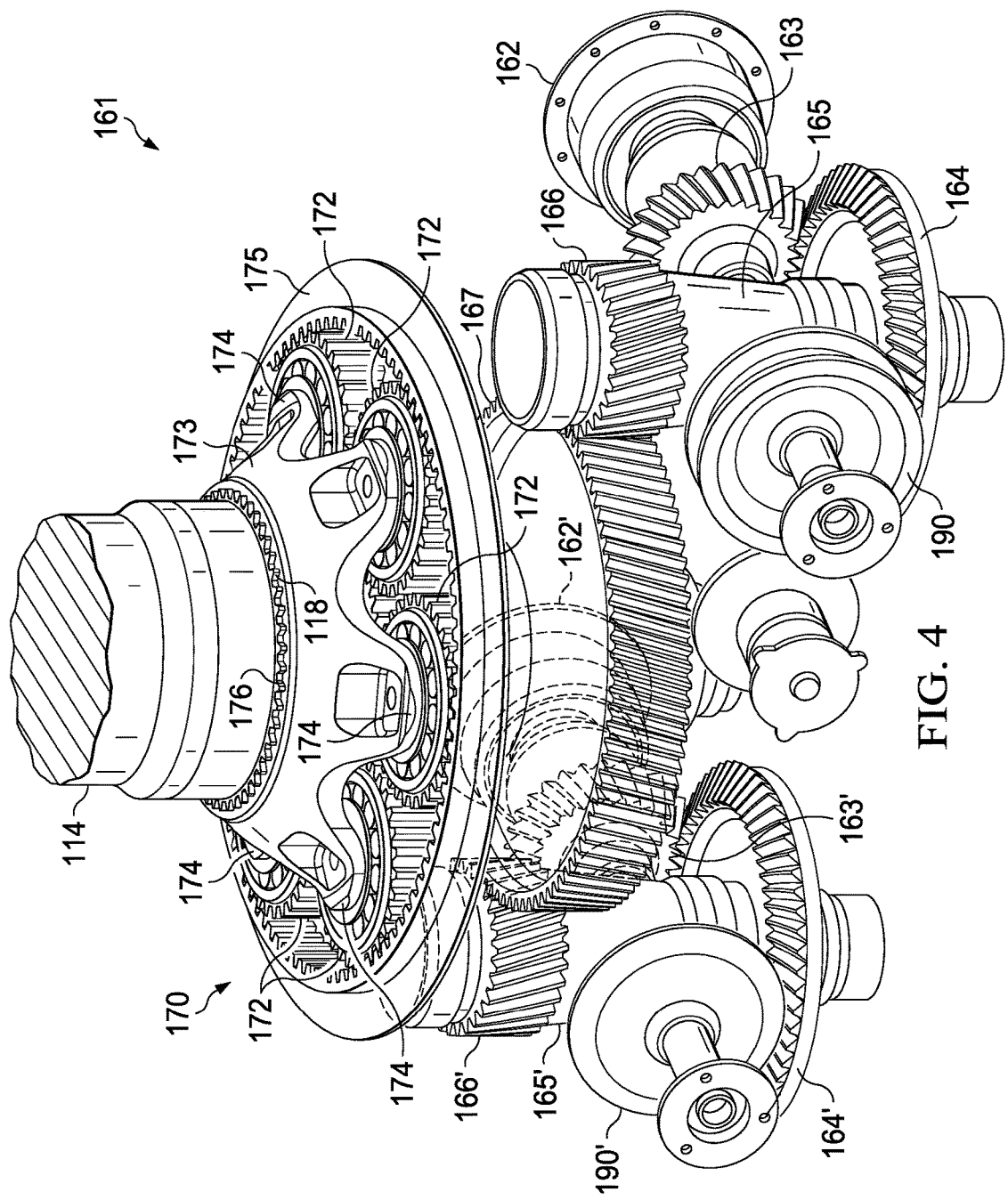
FIG. 4 shows the geartrain within the rotorcraft gearbox of FIG. 3A.
Figure 5:
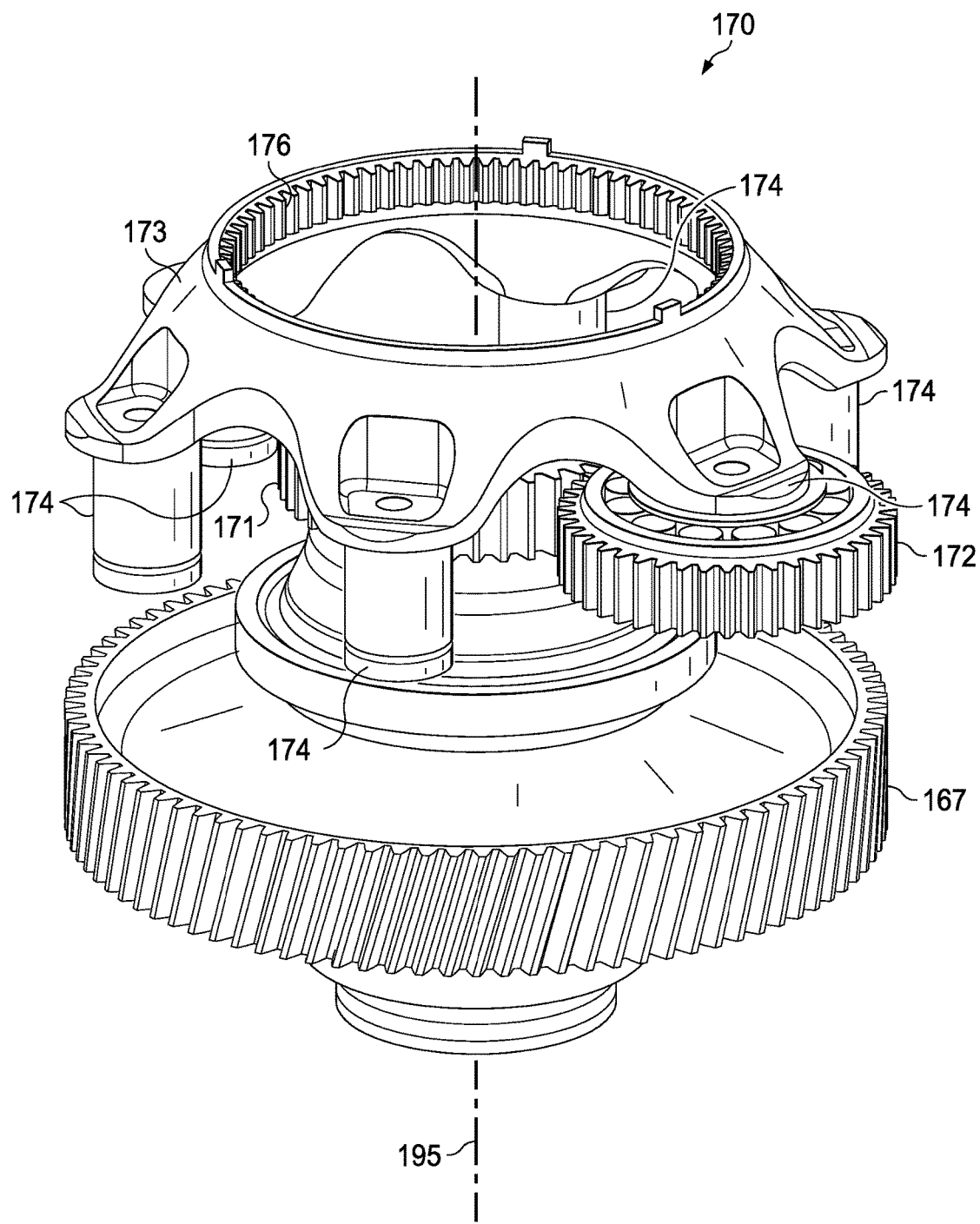
FIG. 5 shows the planetary gearset according to the geartrain of FIG. 4.

FIGS. 4 and 5 illustrate a gear train 161 contained within gearbox housing 180. Referring to the embodiment of FIG. 4, gear train 161 includes an input pinion 162. Input pinion 162 is in mechanical communication with, and receives rotational energy from, a power source (e.g., engine 112). Input pinion 162 includes a helical bevel gear portion 163. The helical bevel gear portion 163 of input pinion 162 meshes with, and transmits rotational energy to, bevel gear 164. Bevel gear 164 is a helical bevel gear. Bevel gear 164 meshes with and drives an accessory drive gear 190, which is configured to provide rotational energy to an accessory gearbox (not shown) and/or various aircraft accessories, such as air blowers, cooling fans, lubrication pumps, hydraulic pumps, electrical generators, and similar components and systems (not shown). Bevel gear 164 is attached via a common shaft 165 to helical spur gear 166. Thus, bevel gear 164, common shaft 165, and helical spur gear 166 rotate together about a common axis. Torque applied to bevel gear 164 is transmitted via common shaft 165 to helical spur gear 166. Helical spur gear 166 meshes with, and transmits rotational energy to, bull gear 167. Bull gear 167 is integral with sun gear 171 (see FIG. 5) of planetary gear set 170. Thus, torque applied to bull gear 167 is transmitted to sun gear 171.

The embodiment of FIG. 4 is configured to receive rotational energy from two power sources. Specifically, gear train 161 includes a second input pinion 162', which may be configured to receive rotational energy from a second power source (e.g., a second engine 112). Second input pinion 162' includes a helical bevel gear portion 163'. The helical bevel gear portion 163' of second input pinion 162' meshes with, and transmits rotational energy to, a second bevel gear 164'. Like bevel gear 164, second bevel gear 164' is a helical bevel gear. Second bevel gear 164' meshes with and drives a second accessory drive gear 190', which is configured to provide rotational energy to an accessory gearbox (not shown) and/or various aircraft accessories, such as air blowers, cooling fans, lubrication pumps, hydraulic pumps, electrical generators, and similar components and systems (not shown). Second bevel gear 164' is attached via a second common shaft 165' to a second helical spur gear 166'. Thus, second bevel gear 164', second common shaft 165', and second helical spur gear 166' rotate together about a common axis. Torque applied to second bevel gear 164' is transmitted via second common shaft 165' to second helical spur gear 166'. Second helical spur gear 166' meshes with, and transmits rotational energy to, bull gear 167, which is integral with sun gear 171 (see FIG. 5). Accordingly, rotational energy provided at either or both input pinions 162, 162' is ultimately combined at bull gear 167 and transmitted to sun gear 171.

Figure 6:
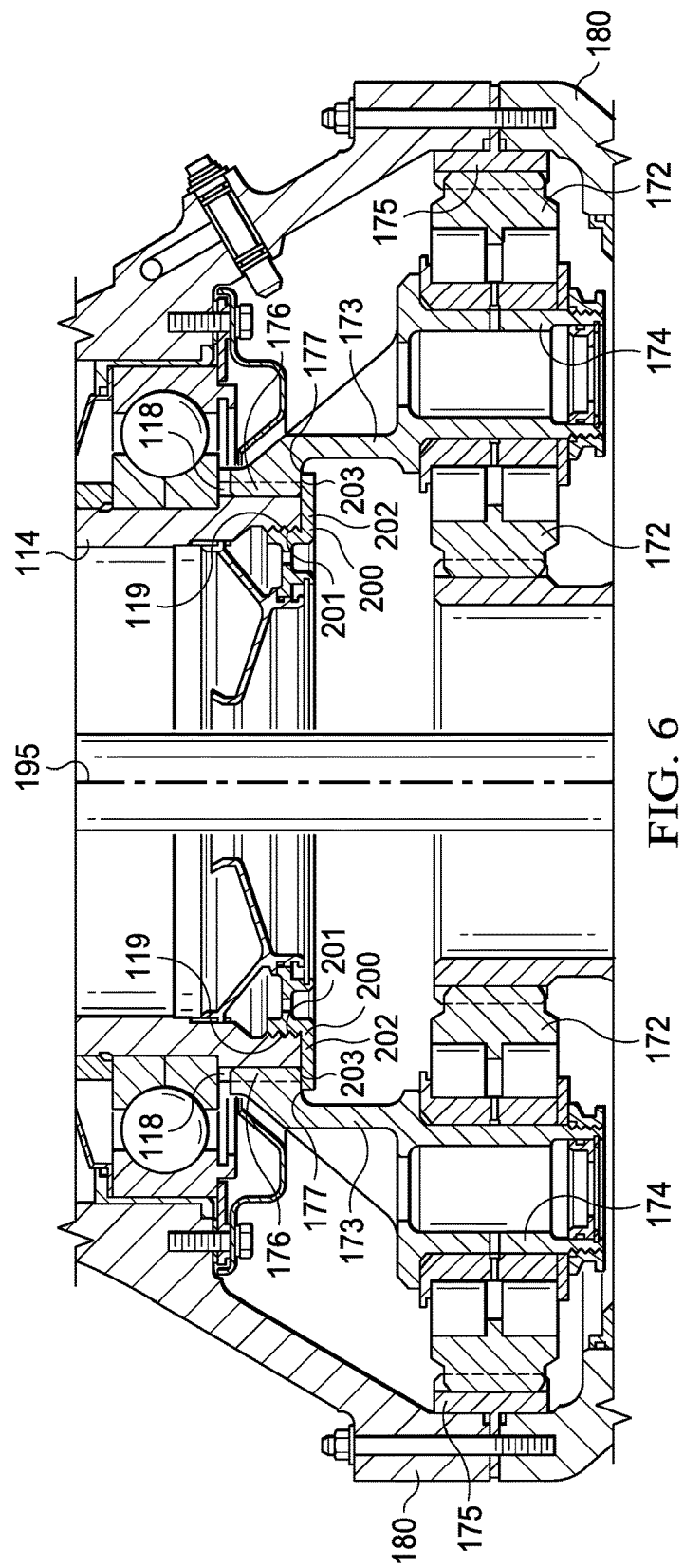
FIG. 6 shows a partial cross-section of a rotorcraft gearbox, according to the viewpoint established by the 6-6 section lines shown in FIG. 3B.

FIG. 5 depicts the planetary gear set 170 within gear train 161. Specifically, sun gear 171 is a straight-cut spur gear that meshes with, and transmits rotational energy to, a plurality of planet gears 172. Planet gears 172 are rotatably mounted to a planetary carrier 173. The embodiment of FIGS. 5 and 6 includes a total of six planetary gears 172, but only one planetary gear 172 is shown in FIG. 6 for clarity. According to the present embodiment, planetary carrier 173 includes a plurality of posts 174 configured to receive each of the plurality of planet gears 172. Each post 174, therefore, defines the rotational axis for a corresponding planet gear 172 rotatably mounted thereon. The planetary carrier 173 of FIGS. 4 and 5 is an overhung planetary carrier, having a plurality of downwardly-extending, cantilevered posts 174. However, one skilled in the art will appreciate that other configurations and orientations are possible for the planetary gear set 170, including the planetary carrier 173. For instance, in an alternative embodiment planetary carrier 173 might be a conventional planetary carrier, which one skilled in the art would appreciate as comprising a lower plate, an upper web, and planetary posts extending between the lower plate and upper web.

Referring to FIG. 4, each planet gear 172 also meshes with ring gear 175. Ring gear 175 is stationary. According to the present embodiment, ring gear 175 is fixedly mounted within gearbox housing 180 and does rotate with respect to the gearbox housing 180. Planetary carrier 173 establishes the spatial relationship among the sun gear 171, the planet gears 172, and the ring gear 175, such that each planet gear 172 meshes with both the sun gear 171 and the ring gear 175. Because the sun gear 171 rotates while the ring gear 175 is fixed, the planet gears 172 travel on an orbiting path about sun gear 171 as they rotate on posts 174. This orbiting action causes planetary carrier 173 to rotate.

According to the embodiment depicted in FIGS. 4 and 5, the planetary carrier 173 includes internal splines 176. Internal splines 176 mesh with mating external splines 118 on rotor mast 114 (see FIG. 4). Thus, planetary carrier 173 serves as the main output for gearbox 160 by transmitting rotational energy to rotor mast 114. In the embodiment of FIGS. 4 and 5, the bull gear 167, sun gear 171, planetary carrier 173, and rotor mast 114 all rotate about a substantially common axis of rotation 195 (see FIGS. 5-7).

FIG. 6 depicts a partial cross-section of gearbox 160, in the area of the planetary gear set 170. The viewpoint of the cross-section of FIG. 6 corresponds to the section lines (6-6) shown in FIG. 3B. According to the embodiment of FIG. 6, a retainer 200 attached to the rotor mast 114 provides axial support for the planetary carrier 173. Specifically, retainer 200 is a threaded ring having external threads 201 and a flange portion 202. The external threads 201 mate with internal threads 119 located on the rotor mast 114. This threaded connection attaches retainer 200 to the rotor mast 114. The flange portion 202 of retainer 200 extends radially with respect to the axis of rotation 195. Flange portion 202 includes a contact surface 203 that provides support in an axial direction to planetary carrier 173. According to the embodiment of FIG. 6, the contact surface 203 is an upper surface of flange portion 202. A corresponding contact surface 177 is provided on planetary carrier 173 and configured to mate with the contact surface 203 of the retainer 200. The corresponding contact surface 177 is adjacent to the internal splines 176 of planetary carrier 173.

Figure 7:
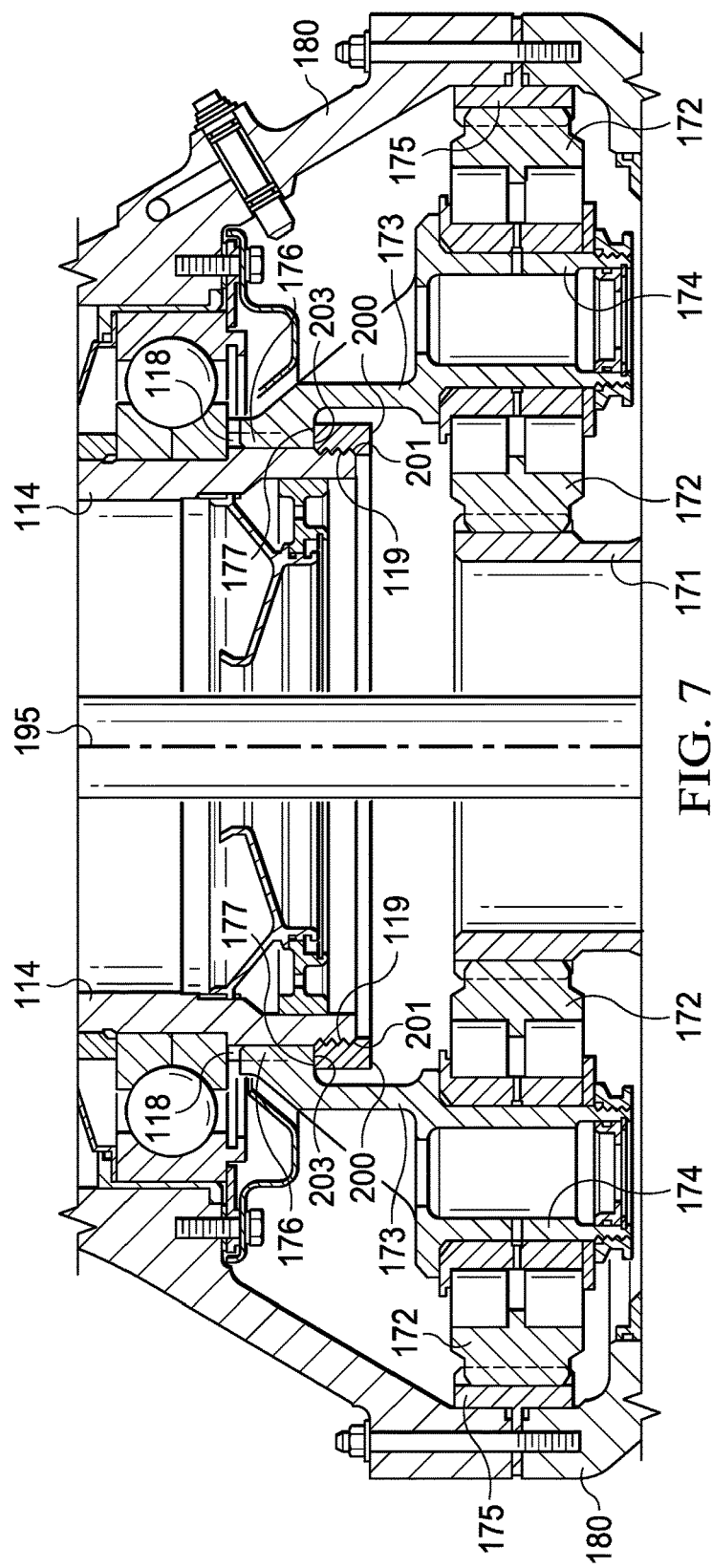
FIG. 7 shows a partial cross-section of an alternative rotorcraft gearbox, according to the viewpoint established by the 6-6 section lines of FIG. 3B.

FIG. 7 depicts the partial cross-section of FIG. 6 according to an alternative embodiment. The viewpoint of the cross-section of FIG. 7 corresponds to the section lines (6-6) shown in FIG. 3B. Similar to the embodiment of FIG. 6, a retainer 200 attached to the rotor mast 114 provides axial support for the planetary carrier 173. However, in the embodiment of FIG. 7, retainer 200 is a threaded ring having internal threads 201. The internal threads 201 mate with external threads 119 located on the rotor mast 114. This threaded connection attaches retainer 200 to the rotor mast 114. Retainer 200 also includes a contact surface 203 that provides support in an axial direction to planetary carrier 173. According to the embodiment of FIG. 7, the contact surface 203 is an upper surface of retainer 200. A corresponding contact surface 177 is provided on planetary carrier 173 and configured to mate with the contact surface 203 of the retainer 200. The corresponding contact surface 177 is adjacent to the internal splines 176 of planetary carrier 173.

Thus, the embodiments of FIGS. 6 and 7 eliminate the need for a carrier-support bearing, which would otherwise be necessary in order support the planetary carrier 173 relative to some other fixed or rotating structure within the gearbox (such as gearbox housing 180 or sun gear 171) while still allowing the planetary carrier 173 to rotate about axis of rotation 195. Additionally, the embodiments of FIGS. 6 and 7 do not utilize a unitary rotor mast with integral planetary carrier, and, therefore, the embodiments of FIGS. 6 and 7 avoid the above-described disadvantages associated with such a gearbox design.

One of ordinary skill will recognize that alternative retainer configurations may exist that—while not shown in FIGS. 6 and 7—are nevertheless enabled by this disclosure and may be within the scope of, or equivalent to, the claims that follow. For instance, a variety of mechanical interfaces might be utilized to engagably couple retainer 200 to rotor mast 114. In one alternative embodiment, retainer 200 comprises a snap ring that is configured to engage a corresponding annular groove located in rotor mast 114. In yet another embodiment, retainer 200 is attached to rotor mast 114 using one or more fasteners (e.g., bolts, studs, nuts, rivets, pins, etc.) to form the connection. In another embodiment, retainer 200 includes tabs or pins that engage a slotted pathway in rotor mast 114. And in yet another exemplary embodiment, retainer 200 is equipped with tabs that engage into corresponding depressions or apertures in rotor mast 114. The tabs of this embodiment may be spring-loaded such that they "click" into the depressions or apertures of rotor mast 114. Alternatively, the tabs may be deformable such that they are bent or pressed into the depressions or apertures of rotor mast 114.

In the embodiment of FIG. 6, contact surface 203 is located on flange portion 202 and is a continuous circular surface that extends radially about the entire circumference of retainer 200. In the embodiment of FIG. 7, contact surface 203 is a continuous circular surface located on an upper portion of retainer 200. However, a variety of alternative mechanical interfaces might be utilized between retainer 200 and planetary carrier 173. For example, in an alternative embodiment similar to FIG. 6, flange portion 202 is one or more tabs extending radially from retainer 200, and contact surface 203 includes one or more surfaces located on the tabs. And in an alternative embodiment similar to FIG. 7, contact surface 203 may be located on one or more bosses provided on retainer 200.

Modifications, additions, or omissions may be made to the methods, systems, and apparatuses described herein without departing from the scope of the invention. The components of the systems and apparatuses may be integrated or separated. Moreover, the operations of the systems and apparatuses may be performed by more, fewer, or other components. Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

The invention claimed is:

1. An aircraft gearbox comprising:
a gearbox housing;
a planetary gear set disposed within the gearbox housing, the planetary gear set comprising:
a sun gear;
a ring gear;
a planetary carrier; and
a plurality of planet gears; and
a retainer configured to be coupled to a mast, the retainer comprising a flange portion, a surface configured to support the planetary carrier being located on the flange portion.

2. The aircraft gearbox according to claim 1, wherein:
the planetary carrier comprises an overhung planetary carrier, having a plurality of downwardly-extending, cantilevered posts; and
each of the plurality of planet gears is rotatably mounted on one of the posts of the planetary carrier.

3. The aircraft gearbox according to claim 1, wherein the ring gear is stationary.

4. The aircraft gearbox according to claim 1, wherein the sun gear is configured to receive rotational energy from an input, and the planetary carrier is configured to transmit rotational energy to the mast.

5. The aircraft gearbox according to claim 4, wherein the planetary carrier is configured to transmit rotational energy to the mast through a first set of splines provided on the planetary carrier and a second set of splines provided on the mast.

6. The aircraft gearbox according to claim 1, wherein:
the sun gear, the planetary carrier, and the mast are all configured to rotate about a substantially common axis of rotation, the axis of rotation defining an axial direction; and
the surface configured to support the planetary carrier is configured to support the planetary carrier in the axial direction.

7. The aircraft gearbox according to claim 6, wherein: the flange portion extends radially with respect to the axis of rotation.

8. The aircraft gearbox according to claim 1, wherein the retainer is configured to be coupled to the mast through a threaded connection.

9. The aircraft gearbox according to claim 8, wherein the retainer comprises external threads configured to mate with internal threads provided on the mast.

10. The aircraft gearbox according to claim 1, wherein the surface configured to support the planetary carrier comprises a continuous circular surface.

11. A retainer for supporting a planetary carrier within a gearbox comprising:
a coupling feature adapted for coupling the retainer to a mast; and
a flange portion, a surface configured to support the planetary carrier being located on the flange portion.

12. The retainer according to claim 11, wherein:
the planetary carrier is configured to rotate about an axis of rotation, the axis of rotation defining an axial direction; and
the surface configured to support the planetary carrier is configured to support the planetary carrier in the axial direction.

13. The retainer according to claim 12, wherein the flange portion extends radially with respect to the axis of rotation.

14. The retainer according to claim 11, wherein the coupling feature comprises a first thread feature configured to mate with a second thread feature provided on the mast.

15. The retainer according to claim 11, wherein the coupling feature is configured to engage a groove provided on the mast.

16. The retainer according to claim 11, wherein the surface configured to support the planetary carrier comprises a continuous circular surface.

17. An aircraft gearbox comprising:
a gearbox housing;
a planetary gear set disposed within the gearbox housing, the planetary gear set comprising:
a sun gear;
a ring gear;
a planetary carrier; and
a plurality of planet gears; and
a retainer configured to be coupled to a mast, the retainer comprising:
a surface configured to support the planetary carrier; and
external threads configured to mate with internal threads provided on the mast.

18. The aircraft gearbox according to claim 17, wherein:
the planetary carrier comprises an overhung planetary carrier, having a plurality of downwardly-extending, cantilevered posts; and
each of the plurality of planet gears is rotatably mounted on one of the posts of the planetary carrier.

19. The aircraft gearbox according to claim 17, wherein the ring gear is stationary.

20. The aircraft gearbox according to claim 17, wherein the sun gear is configured to receive rotational energy from an input, and the planetary carrier is configured to transmit rotational energy to the mast.

21. The aircraft gearbox according to claim 20, wherein the planetary carrier is configured to transmit rotational energy to the mast through a first set of splines provided on the planetary carrier and a second set of splines provided on the mast.

22. The aircraft gearbox according to claim 17, wherein:
the sun gear, the planetary carrier, and the mast are all configured to rotate about a substantially common axis of rotation, the axis of rotation defining an axial direction; and
the surface configured to support the planetary carrier is configured to support the planetary carrier in the axial direction.

23. The aircraft gearbox according to claim 22, wherein:
the retainer further comprises a flange portion extending radially with respect to the axis of rotation; and
the surface configured to support the planetary carrier is located on the flange portion.

24. The aircraft gearbox according to claim 17, wherein the surface configured to support the planetary carrier comprises a continuous circular surface.

25. A retainer for supporting a planetary carrier within a gearbox comprising:
a surface configured to support the planetary carrier; and
external threads configured to mate with internal threads provided on a mast.

26. The retainer according to claim 25, wherein:
the planetary carrier is configured to rotate about an axis of rotation, the axis of rotation defining an axial direction; and
the surface configured to support the planetary carrier is configured to support the planetary carrier in the axial direction.

27. The retainer according to claim 26, further comprising a flange portion extending radially with respect to the axis of rotation, the surface configured to support the planetary carrier being located on the flange portion.

28. The retainer according to claim 25, wherein the retainer comprises a flange portion, the surface configured to support the planetary carrier being located on the flange portion.

29. The retainer according to claim 25, wherein the surface configured to support the planetary carrier comprises a continuous circular surface.

* * * * *